US012624321B2

(12) United States Patent
Wessman

(10) Patent No.: US 12,624,321 B2
(45) Date of Patent: May 12, 2026

(54) OPACIFIED SPARKLING WHITE WINE AND METHOD FOR PRODUCING SAME

(71) Applicant: MAISON WESSMAN

(72) Inventor: Vilhem Robert Wessman, London (GB)

(73) Assignee: MAISON WESSMAN, Saint Cernain de Cabardes (FR)

( * ) Notice: Subject to any disclaimer, the term of this patent is extended or adjusted under 35 U.S.C. 154(b) by 531 days.

(21) Appl. No.: 18/003,537

(22) PCT Filed: Jun. 29, 2021

(86) PCT No.: PCT/FR2021/051196
§ 371 (c)(1),
(2) Date: Dec. 28, 2022

(87) PCT Pub. No.: WO2022/003292
PCT Pub. Date: Jan. 6, 2022

(65) Prior Publication Data
US 2023/0272315 A1    Aug. 31, 2023

(30) Foreign Application Priority Data

Jun. 30, 2020    (FR) ...................................... 2006897

(51) Int. Cl.
*C12G 1/06*        (2019.01)
*C01B 32/312*      (2017.01)
*C12H 1/044*       (2006.01)

(52) U.S. Cl.
CPC .............. *C12G 1/06* (2013.01); *C01B 32/312* (2017.08); *C12H 1/0408* (2013.01); *C01P 2004/61* (2013.01); *C01P 2004/62* (2013.01); *C12G 2200/21* (2013.01)

(58) Field of Classification Search
CPC ........ C12H 1/0408; C12G 1/06; C01B 32/30; C01B 32/312; C01B 32/354
See application file for complete search history.

(56) References Cited

U.S. PATENT DOCUMENTS

2015/0202594 A1*    7/2015    Adler ................... B01J 20/3021
95/134

FOREIGN PATENT DOCUMENTS

FR        2689903 A1    10/1993

OTHER PUBLICATIONS

Guillon et al.FR 2689903 A1 Google Patents machine translation (Year: 1993).*
International Search Report (English Translation) for corresponding PCT/FR2021/051196 dated Oct. 12, 2021 (5 pp).

* cited by examiner

*Primary Examiner* — Vera Stulii
(74) *Attorney, Agent, or Firm* — Renner, Kenner; Arthur M. Reginelli

(57) ABSTRACT

The invention relates to a bottled sparkling white wine and to the method for producing same. The bottled wine contains a measured amount of an opacifying agent that does not alter the organoleptic properties of the wine; said measured amount, added prior to final corking of the bottle, consists of a suspension of finely divided oenological activated carbon in a food-grade liquid.

4 Claims, 1 Drawing Sheet

Figure 1:
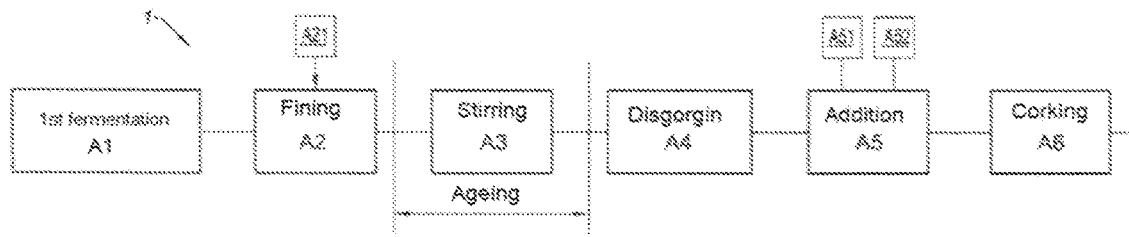

1 Homogenisation by ultrasound
2 Ultrasound bath

OPACIFIED SPARKLING WHITE WINE AND METHOD FOR PRODUCING SAME

FIELD OF THE INVENTION

This invention refers to sparkling white wine and its production method, for a bottled sparkling white wine, There are many methods of making bottled sparkling white wine in bottles of varying volume, from half bottles, to bottles of the standard content, to magnums and various other forms of larger bottles.

In short, the best known sparkling white wines are a sparkling wine obtained from a primary fermentation of the must, then the addition of a tirage liqueur to carry ensure a secondary fermentation in the bottle. After at least 15 months of ageing (for champagne), the bottles are stirred (remuage) then disgorged (degorgement) and before definitive corking, the shipping liqueur is added a sparkling wine can be obtained in a closed vat (or Charmat) method by a primary fermentation of the must, while the secondary fermentation ("prise de mousse") takes place in special closed vats designed to resist to the pressure. When the wine has become sparkling (pressure around 6 bar at 15° C.), it is filtered and then transferred to bottles, then before final corking (corks), the bottle is topped up with liqueur de dosage (liqueur).

a sparkling wine obtained by the ancestral method (referred to as dioise) by partial primary fermentation of the must (the fermentation is stopped by cold), the wines are then filtered, and the bottles are washed before being refilled. After a secondary fermentation in the bottle, these bottles are stirred and then disgorged before final corking.

A sparkling wine obtained by the gasification method. After clarification of the wine coming from alcohol fermentation, the pressure is obtained by direct dissolution of exogenous carbon dioxide in the vat, followed by transfer to the bottle. The bottles are then permanently corked before being marketed.

STATE OF THE ART

Special wines include sparkling (mousseux) wines made from grapes, must or wine processed according to the techniques accepted by the OIV, characterised, on uncorking, by the generation of a more or less persistent foam due to the release of exclusively endogenous carbon dioxide. The overpressure of the gas in the bottle is at least 3.5 bar at 20° C. However, for bottles containing less than 0.25 litre, the minimum overpressure shall be reduced to 3 bar at 20° C.

Depending on the production technique, sparkling wines are said to be by:

secondary fermentation in the bottle, secondary fermentation in a closed vat.

The wine is said to be dry (brut) when it contains a maximum of 12 g/l of sugar with a tolerance of +3 g/l, extra dry (extra-sec) when it contains at least 12 g/l and at most 17 g/l with a tolerance of +3 g/l, dry (sec), when it contains at least 17 g/l and at most 32 g/l with a tolerance of +3 g/l.

semi-dry (demi-sec), when it contains between 32 and 50 g/l, sweet (doux) when it contains more than 50 g/l.

Sparkling wines are also defined and regulated by CE regulation 478/2008 which defines eight main categories of sparkling wines.

The French regulations make a distinction between four categories.

Sparkling wines are usually obtained using the traditional method, commonly called the Methode Champenoise, which can be summarised in a few stages: the must is fermented and then the unfermented wine is bottled with a tirage liqueur and yeasts to initiate the secondary fermentation. After at least fifteen months of ageing, the bottles are stirred (remuage) then disgorged, and before final corking, the liqueur (liqueur d'expedition) is added.

This sparkling white can be white or rosé. The quantitative characteristics of these colours are not referred to in any codex or technical chart.

There are also sparkling red wines, for example, the Italian Lambrusco, obtained by the natural method, or by gasification. This wine is traditionally red with a purplish-red colour.

Italy also produces Sparkling Shiraz which is a sparkling red wine made from a black grape variety like Lambrusco.

These rosé or red sparkling wines are clear, transparent or translucent wines.

There is also a known method wherein wine making processes sometimes use oenological activated carbon (charbon actif cenologique—CAO). This activated carbon is defined by the International Oenological Codex (IOC): 53; OENO 7/2007). It is used to colour or deodorise the must. It can also be used for wine-making The carbon is extracted from the wine by filtration, fining and/or centrifugation.

The activated carbon that may be added to the must, having absorbed the chemical components that have a negative influence from the health or sensory standpoints, is collected with the waste must from the vat after various operations such as racking.

The wine collected from the vat no longer contains any activated carbon.

PURPOSE OF THE PURPOSE OF THE INVENTION

The purpose of the present invention is to develop a stable, opaque, sparkling, white wine and means for obtaining such a wine.

ABSTRACT AND ADVANTAGES OF THE INVENTION

For this purpose, the invention concerns a bottled white sparkling wine, characterized in its containing dose of activated carbon not altering the organoleptic properties of the wine, the dose of opacifier being deposited (in a suspension in a liquid food) of finely divided oenological activated carbon with a particle size of 5 μm or less.

Preferably, the finely divided activated oenological carbon has a particle size of less than 3 μm for 90% of the activated oenological carbon particles.

The particle size of the oenological activated carbon according to the invention is a particle size measured, for example, by the laser particle size method. This process consists of determining the average diameter by Dv volume of activated oenological carbon particles. This measurement is the mean diameter of a sphere enclosing a particle of oenological activated carbon in its finely divided state.

An advantageous feature is that the liquid food is distilled water or wine.

According to the invention, the concentration of finely divided oenological activated carbon of the dose is between 5 and 50 mg.

The invention also relates to a process for the preparation of an opacified sparkling wine. This process is characterized by the addition of a dose of opacifier, before the final corking step, which consists of a suspension of finely divided oenological activated carbon in a liquid food, wherein the concentrate resulting from the sonication is filtered with a 5 gm nitrate.

According to another characteristic, the process of producing a sparkling white yin consists in adding, at the time of tirage, a dose of opacifier which consists of a suspension of finely divided finely oenological activated carbon in a liquid food, while the concentrate resulting from the sonication is filtered with a 5 μm filter.

The invention also relates to a suspension of finely divided oenological activated carbon in a liquid food, whereby the concentrate resulting from the sonication is filtered with a 5 μm filter.

The invention also relates to a suspension for dosing a sparkling white wine with activated carbon, consisting of using a suspension of 20 g/l of finely ground oenological activated carbon A method for the preparation of oenological activated carbon according to the invention consists in:

Preparing an initial suspension of powdered oenological activated carbon in a liquid food, Homogenising the suspension by mechanical agitation to distribute the powdered oenological activated carbon in the liquid food, Breaking up the suspended oenological activated carbon by ultrasound sonication, Separating the larger particles from the smaller ones by at least one centrifugation step, collecting the supernatant after each centrifugation step and then collecting the final supernatant, and concentrating the final supernatant containing suspended finely divided activated carbon.

This method further consists in

Centrifugal action in three successive stages collecting the supernatant at the end of a centrifugation step and subjecting it to the next centrifugation step, repeated at least three times.

or, subjecting the final supernatant collected at the end of the final stage to evaporation and collecting the concentrate.

or, subjecting the concentrate to sonication in an ultrasonic bath.

or, filtering the concentrate resulting from the sonication through a 5 μm filter.

or, adding to the filtered concentrate a liquid food consisting of water or wine to obtain the dosage or tirage liqueur in a concentration of between 0.01 and 10 g/l, of finely divided oenological activated carbon.

The process for producing a sparkling white wine is characterised in that, after the so-called primary alcohol fermentation, a dose of between 0.01-1 g/l of activated carbon (finely-divided oenological (S'2), with a particle size of less than or equal to 5 μm, is added.

The method for producing a sparkling white wine is characterised in that, at the clarification stage a dose of between 0.01 g/l of finely divided oenological activated carbon (S'2) with a particle size of less than or equal to 5 μm is added.

BRIEF DESCRIPTION OF THE ILLUSTRATIONS

The present invention will be described below using an example of a process for the production of a sparkling white wine according to the traditional method, opacified as illustrated by the accompanying drawings:

FIG. 1 diagram of the production of a sparkling white wine.

Figure 2:
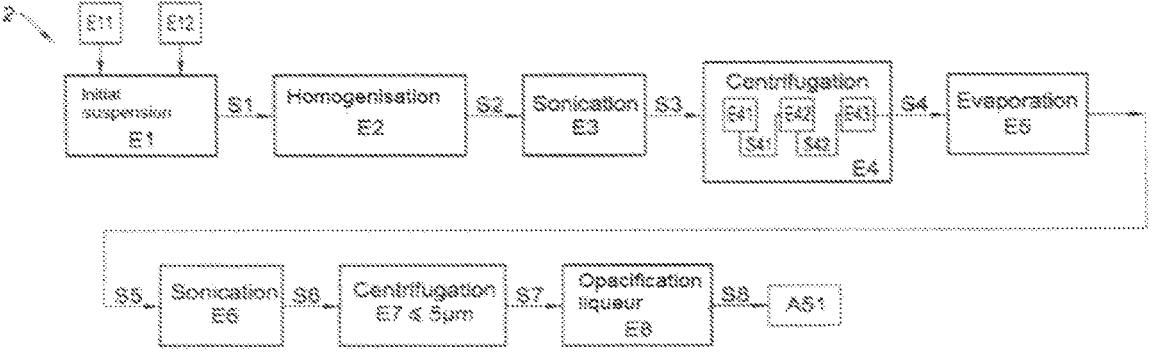

FIG. 2 diagram of the process for preparing the dosage liqueur.

Figure 3:
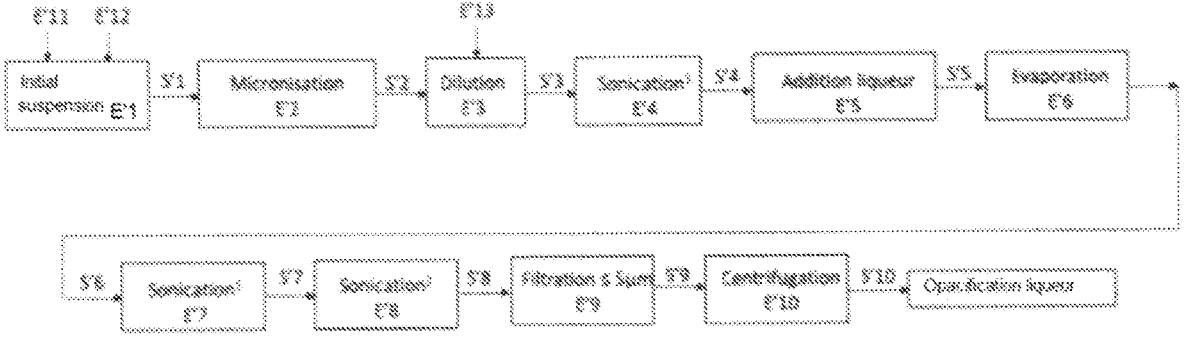

FIG. 3 diagram of a variance of the preparation process of the dosage liqueur.

DESCRIPTION OF AN EMBODIMENT

In FIG. 1, the traditional method of making opacified, bottled sparkling white wine 1 consists of first fermenting the must A1 and then bottling still wine A2 with the addition of a tirage liqueur and yeasts A21 and a fining or stirring additive. The bottled wine ages for at least fifteen months. At the end of this ageing period, the deposits accumulated in the neck of the bottle following the riddling stage are eliminated during the disgorging process A4. Before the final corking, the expedition liqueur (or dosage liqueur) A51 is added before putting the product on sale.

According to the invention, before the final corking A6, a dose of opacifier A52 is added at the same time or with the dosing liqueur A51, which does not alter the organoleptic properties of the wine. The bottle is then corked.

FIG. 2 is a schematic diagram of a typical method for preparing an oenological activated carbon and a process for preparing the dosage liqueur for opacifying a sparkling white wine.

Method 2 starts with the step of preparing an initial suspension E1 of oenological activated carbon E11 in a liquid E12 like distilled water or preferably wine.

The activated carbon is of vegetable origin comprising a powder of fine particles measuring between 1 and 100 μm. This oenological activated carbon meets the requirements of the international oenology CODEX (INS 153 OEN07/2007; OIV-OEN 604/218). This suspension of oenological activated carbon S1 prepared in this way will undergo several treatments to obtain a suspension of finely divided oenological activated carbon forming the finest possible dosage liqueur before filtering the concentrate resulting from the sonication with a 5 μm filter.

The initial suspension Si is made up with a concentration in the range of 1 to 100 g/L.

The initial suspension Si is then first homogenised E2 by mechanical agitation for instance.

The homogenised initial suspension S2, undergoes ultrasound sonication for three hours E3 to obtain a de-fragmented CAO-based suspension S3.

All the liquid is collected and put through successive centrifugation steps E4.

During a first centrifugation step E41 carried out at a speed of rotation of about 1200 RCF for a period of about 30 minutes, the supernatant S41 is collected, i.e. part of the suspension in the upper part of the centrifuge vessel.

This supernatant is subjected to S41 a further centrifugation step E42 to collect a new supernatant S42.

These centrifugation steps E41, E42, E43 are performed successively and end with the final supernatant S4.

Since the centrifugation steps E4 reduce the volume of liquid, several centrifugation sessions are carried out in parallel to obtain a final supernatant volume S4 by adding their results.

The filter supernatant is then reduced by evaporation ES producing a reduction rate of between 1 and 2% of S5 concentrate.

The centrifugation steps are carried for around 30-180 minutes at speeds of about 500-2200 RCF. The supernatants are checked by measuring their optical density OD at 620 nm.

The concentrate S5 is goes through ultrasound sonication for three hours E6 to obtain a final defragmented concentrate S6. The final concentrate S7 derived from this stage E7 is filtered with a filter retaining particles larger than 5 microns.

The analysis of the resulting finely divided oenological activated carbon was carried out by laser particle size measurement. It revealed that the average diameter by volume Dv of the finely divided oenological activated carbon particles was less than 3 microns for 90% of the particles. The average diameter by volume is, by definition, the diameter of the envelope sphere or a sphere circumscribed around an analysed activated carbon particle. Tests have shown that the finely divided oenological activated carbon of the invention remains suspended in a particularly stable manner in the wine.

For the preparation of a dosage suspension for opacifying a sparkling white wine, the concentrate S7 thus collected is added E8 to a complement of liquid food to obtain the dosage suspension S8 (dosage liqueur).

This dosage suspension S8 is added A5 to the bottle and disgorged white wine before final caulking, in parallel to or with the dosage/expedition liqueur.

The concentration of oenological active carbon in a dose is included between 5 and 50 mg.

The concentration of dosage liqueur is advantageously included between 0.1 and 10 g/litre of finely divided oenological carbon.

FIG. 3 is a diagram of a variant of the oenological active carbon preparation method a process for the generation of the dosage liqueur for the opacification of a sparkling white wine.

Process 3 begins with a stage for preparing and initial suspension E'1 of oenological Active carbon E'11 in a liquid food E'12 such as distilled water or, even better, wine.

The oenological active carbon is of vegetable origin, in the form of a powder comprising fine particles measuring between 1 and 100 μm. This oenological active carbon meets the requirements of the international oenological CODEX (SIN 153 OENO7/2207; OIV-OEN 604/218). This oenological activated carbon suspension S'1, prepared in this way, will go through several treatments to obtain a finely divided oenological activated carbon suspension forming the finest possible dosage liqueur.

The initial suspension S'1 is prepared with a concentration of between 50 and 1000 g/l. The initial solution S'1 is then finally ground or micronized E'2 using a horizontal micro bead grinder, for instance a Netzsch Labstar grinder, using metal micro beads or metal oxides having a diameter included between 100-1000 μm. The filling factor of the grinder is included between 10-90% of its capacity and the rotation speed is between 1000-5000 RPM. The grinding time is included between 1-24 hours to reach a final factor of the carbon in the initial solution S'2 included between 1-20% mass concentration.

The micronized initial suspension S'2 is diluted E'3 in liquid food E'13 such as demineralized water.

The micronized and diluted initial suspension S'3 is broken up by ultrasound homogenization for a time included between at least 1 to 15 min E'4 to obtain a defragmented activated carbon-based suspension S'4.

All the defragmented liquid is collected, and a sufficient quantity of liqueur E'S is added, the total volume of which S'S is reduced by evaporation by 30-60% of its initial volume E'6.

The resulting concentrate S'6 is further broken up by a first ultrasonic homogenisation step for a period of 1-15 min E'7 and the resultant product S'7 is again subjected to a further sonication step in ultrasonic baths for a period of 1-3 h E'S. The ultrasonic homogenisation time is relatively short due to the energy supplied by the probe, to avoid any caramelisation of the liqueur.

The concentrate obtained S'8 is finally filtered on 5 μm filters E'9 retaining particles larger than 5 μm in order to obtain a filter concentrate S'9 with particles smaller than 5 μm.

The filtered concentrate is subjected to E'10 centrifugation to collect a final supernatant S'10.

The centrifugation stage is carried out at a speed of rotation between 2000-4000 rpm for a period of about 30-180 minutes.

The supernatant S'10 is collected, i.e. a suspension volume in the upper part of the tube used for centrifugation. Finally, the opacifying liqueur is obtained.

Analysis of the size distribution of the finely divided activated carbon was carried out by laser particle inspection. It shows that the arrange diameter in volume Dv of the finely divided oenological activated carbon particles was less than 0.33 microns for 50% of the particles (the volume average diameter is, by definition, the diameter of the envelope or circumscribed sphere of an analysed activated carbon particle). Tests have shown that the finely divided oenological activated carbon of the invention remains suspended in a particularly stable manner in the wine.

This dosing liqueur is added to the bottled white wine and disgorged, before final corking, in parallel or together with the expedition dosing liqueur.

The final concentration of carbon is between 1 and 50 mg in a 750 mL bottle.

The concentration of the dosage liquor is advantageously between 0.01 and 50 g/L of finely divided oenological carbon.

The invention claimed is:

1. A sparkling white wine packaged in bottles, characterized in its containing a dose of activated carbon not altering the organoleptic properties of the wine consisting of a suspension in a liquid food of finely divided oenological activated carbon with a particle size of 5 μm or less.

2. A sparkling white wine according to claim 1, characterized in that the finely divided oenological activated carbon has a particle size of less than 3 μm for 90% of the carbon particles.

3. A sparkling white wine according to claim 1, characterized in that the liquid food is distilled water or wine.

4. A sparkling white wine according to claim 1, characterized in that the concentration of finely divided oenological activated carbon of a dose is between 5 and 50 mg/L.

* * * * *